US008826507B2

(12) United States Patent
Aono et al.

(10) Patent No.: US 8,826,507 B2
(45) Date of Patent: Sep. 9, 2014

(54) NEEDLE ATTACHING STRUCTURE OF ROTATING SHAFT AND METER DEVICE

(75) Inventors: Yuusuke Aono, Shimada (JP); Shigeki Totsuka, Shimada (JP)

(73) Assignee: Yazaki Corporation, Tokyo (JP)

( * ) Notice: Subject to any disclaimer, the term of this patent is extended or adjusted under 35 U.S.C. 154(b) by 974 days.

(21) Appl. No.: 12/942,359

(22) Filed: Nov. 9, 2010

(65) Prior Publication Data

US 2011/0107575 A1    May 12, 2011

(30) Foreign Application Priority Data

Nov. 9, 2009   (JP) .................................. 2009-256325
Mar. 23, 2010  (JP) .................................. 2010-066851

(51) Int. Cl.
  *B23P 19/04*  (2006.01)
  *B60K 35/00*  (2006.01)
  *G01D 13/26*  (2006.01)
  *G01D 11/28*  (2006.01)
  *B60K 37/02*  (2006.01)

(52) U.S. Cl.
  CPC .............. *G01D 11/28* (2013.01); *B60K 35/00* (2013.01); *G01D 13/265* (2013.01); *B60K 2350/203* (2013.01); *B60K 37/02* (2013.01)
  USPC ....................................................... 29/283.5

(58) Field of Classification Search
  USPC .............. 29/281.1, 283, 281.6; 116/328, 332, 116/284, 288
  See application file for complete search history.

(56) References Cited

U.S. PATENT DOCUMENTS

| 4,606,106    | A  | * | 8/1986  | Dutton ............................ 29/235 |
| 5,603,283    | A  | * | 2/1997  | Owen ............................ 116/284 |
| 6,270,302    | B1 |   | 8/2001  | Lyons |
| 8,353,254    | B2 | * | 1/2013  | Aono et al. .................. 116/328 |
| 2007/0039541 | A1 |   | 2/2007  | Vuilliomenet et al. |
| 2011/0107575 | A1 | * | 5/2011  | Aono et al. .................. 29/283.5 |
| 2013/0318255 | A1 |   | 11/2013 | Karino |

FOREIGN PATENT DOCUMENTS

| DE | 3425029 A1  | 1/1985 |
| DE | 4344047 A   | 6/1995 |
| DE | 19538547 A1 | 4/1997 |

(Continued)

OTHER PUBLICATIONS

German Office Action issued in counterpart German Application No. 10 2010 043 631.3 on Oct. 21, 2011.

(Continued)

*Primary Examiner* — Lee D Wilson
(74) *Attorney, Agent, or Firm* — Sughrue Mion, PLLC

(57) ABSTRACT

When a press-in part 81 is pressed-in to a press-in hole 93, a vertex of the press-in part 81 deformed to a form along the inner surface of the press-in hole 93 comes into contact with the inner surface of the press-in hole 93 and a press-in force when the press-in part 81 is inserted into the press-in hole 93 or a pull-out force when the press-in part 81 is pulled out from the press-in hole 93 is set in according with the length of an intersecting line that a surface on which the outer surface of the press-in part 81 comes into contact with the inner surface of the press-in hole 93 and a section intersecting orthogonally to the axial direction of the press-in part 81 intersect.

2 Claims, 8 Drawing Sheets

(56) References Cited

FOREIGN PATENT DOCUMENTS

| | | |
|---|---|---|
| DE | 102006018521 A1 | 10/2007 |
| DE | 102007038298 A1 | 2/2009 |
| GB | 2454164 A | 5/2009 |
| JP | 55-68080 U | 5/1980 |
| JP | 59178937 A | 10/1984 |
| JP | 1-120684 U | 8/1989 |
| JP | 06034399 A | 2/1994 |
| JP | 11-194175 A | 7/1999 |
| JP | 2007-506949 A | 3/2007 |

OTHER PUBLICATIONS

Office Action dated Nov. 12, 2013, issued by the Japanese Patent Office in counterpart Japanese Application No. 2010-066851.

Office Action, dated Mar. 18, 2014, issued by the Japanese Patent Office in counterpart Japanese Patent Application No. 2010-066851.

* cited by examiner (A)  (B)

81 PRESS-IN PART
93 PRESS-IN HOLE

NEEDLE ATTACHING STRUCTURE OF ROTATING SHAFT AND METER DEVICE

BACKGROUND

1. Field of the Invention

The present invention relates to a rotating shaft to which a needle is attached that indicates numeric characters of a dial in a meter device of a meter of a vehicle or the like, and more particularly to a needle attaching structure of a rotating shaft in which when the needle is pressed-in to the rotating shaft, a stress is not concentrated to a part, so that the needle can be integrally attached.

2. Description of the Related Art

In such a kind of meter device to be mounted on the vehicle or the like, ordinarily, the dial in which characters, numeric characters and a scale are provided is lighted from a back surface side by an exclusive light source or the needle for indicating the characters or the numeric characters of the dial is lighted (for instance, see patent literature 1).

Specifically, as such a meter device, as shown in FIG. 9, for instance, a meter device is known that includes in a meter box 102 under a dial 101, a light source 103, a needle shaft 104 that guides a light from the light source 103 and having a needle 105 attached integrally to an upper end part, bearings 106 and 107 for supporting the needle shaft 104 so as freely rotate, a gear 108 to which a turning force form a motor not shown in the drawing is transmitted to rotate the needle shaft 104 and the needle 105 and a parabolic shaped reflector 109 provided in a part of a light guide path in which the light from the light source 103 is guided in the needle 105, and the needle 105 is lighted by the emission of the light from the light source 103. In the drawing, reference numeral 110 designates a substrate.

Ordinarily, in order to provide a light guide property in the needle shaft or the needle, the needle shaft or the needle is formed with a suitable resin material and the needle is pressed-in to the needle shaft and integrally attached thereto. Accordingly, when there is a large unevenness in working accuracy between these parts, when the needle is pressed-in to the needle shaft, since the needle is loosely attached to the needle shaft, the needle is easily slipped out from the needle shaft. On the contrary, when the needle is tightly attached to the needle shaft, the needle may be occasionally hardly attached to the needle shaft. Thus, a needle attaching structure is proposed in which parts can be assuredly attached without requiring a highly accurate work (for instance, see patent literature 2).

Namely, as shown in FIGS. 10 and 11, in the needle attaching structure, are provided a shaft part 201 made of a synthetic resin and a needle attaching part 202 formed in an upper end part of the shaft part 201 and a needle not shown in the drawing is attached to the needle attaching part 202. In the needle, a tubular attaching fitting is provided in a bottom surface (a lower surface) side as a base end. An inner part of the attaching fitting forms a cylindrical attaching hole H shown in FIG. 12. In FIGS. 11 and 12, reference numeral 204A designates a corner part of a below-described fitting part 204. 204B designates a side part of the fitting part 204. 205 designates a gear.

The needle attaching part 202 has a tapered part 203 formed in an upper end part side and the straight and substantially regular square pole shaped fitting part 204 formed in a lower part side. The tapered part 203 is formed so as to be smoothly fitted to an attaching hole H of the needle and has a substantially regular square pyramid shape which is gradually thicker toward a lower side. An outer peripheral part 203A in an upper end and each corner part 203B are chamfered. On the other hand, in the fitting part 204, as shown in FIG. 12, a length s between opposed sides is formed to be slightly smaller than the inside diameter r of the attaching hole H of the needle and a length t of each diagonal line is formed so as to be slightly larger than the inside diameter r of the attaching hole H of the needle.

Patent literature 1: German Patent Application Laid-Open No. 19538547

Patent literature 2: JP-UM-A-1-120684

However, in such a needle attaching structure, when a section of the fitting part 204 in the shaft part 201 is a simple polygonal form such as a square form, a space is largely formed between the shaft part and the fitting part. As a result, a large quantity of light leaks from the space, so that a rate of illuminating light guided to reach the needle is greatly reduced to deteriorate a light emitting efficiency. Especially, when a section of the fitting part has a triangular form, the space is so large as not to be neglected, so that a rate of the leakage of the light is increased. Therefore, a needle attaching structure has been desired to be developed that can efficiently transmit the light and realize a light emission and illumination with a good light emitting efficiency.

Further, in such a needle attaching structure, when the fitting part having a section of, for instance, a triangular form is pressed-in to the attaching hole H of the needle, since a difference between levels of press-in loads of contact parts in corner parts respectively is larger than that of non-contact parts of the corner parts which do not respectively come into contact with the attaching hole H, there is a fear that cracks are generated due to a stress concentration in the corner parts respectively. The above-described needle attaching structure has a problem in view of the above-described point.

SUMMARY

The present invention is devised by considering the above-described circumstances and it is an object of the present invention to provide a needle attaching structure of a rotating shaft and a meter device in which a light emitting efficiency of a needle is not extremely deteriorated, an illuminating light can be efficiently transmitted to the needle and the generation of cracks can be prevented.

In order to achieve the above-described object, a needle attaching structure of a rotating shaft according to the present invention is characterized by below-described (1) and (2).

(1) In a needle attaching structure of a rotating shaft in which a press-in part of the rotating shaft having light guide characteristics is pressed-in to a press-in hole of a needle, the press-in hole has a true circular form in section, the press-in part in an end part side of the rotating shaft has a regular n polygonal form in section (in this case, 5≤n), when the press-in part is pressed-in to the press-in hole, a vertex of the press-in part deformed to a form along the inner surface of the press-in hole comes into contact with the inner surface of the press-in hole and a press-in force when the press-in part is inserted into the press-in hole or a pull-out force when the press-in part is pulled out from the press-in hole is set in according with the length of an intersecting line that a surface on which the outer surface of the press-in part comes into contact with the inner surface of the press-in hole and a section intersecting orthogonally to the axial direction of the press-in part intersect.

(2) In a needle attaching structure of a rotating shaft having the structure of (1), the length of the intersecting line is set in accordance with at least one of the diameter of the inner surface of the press-in hole, a length to the vertex from an axis of the press-in part and the number n of the vertexes of the press-in part.

According to the needle attaching structure described in the above-described (1) or (2), a space between the press-in part and the press-in hole can be more reduced than, for instance, a case of a triangular form in section. Accordingly, the light emitting efficiency of the needle is not seriously deteriorated by the leakage of the light from the space, so that the illuminating light can be efficiently transmitted to the needle. Further, since the press-in part has a structure that a rather large number of angular parts of a polygonal form (however, excluding too many angular parts) are respectively distributed to come into contact with the press-in hole, differently from the press-in part of the true circular form in section which comes into contact with the press-in hole in an entire peripheral surface or the press-in part of a triangular form in section which concentrically comes into contact with the press-in hole at a small number of parts such as three angular parts, a large press-in load can be avoided from being concentrically applied to the press-in hole. As a result, even in the needle made of a synthetic resin and having a relatively low strength, the cracks can be prevented from being generated in the press-in hole.

Further, the press-in load of the rotating shaft to the press-in hole is proportional to the contact area thereof, and the contact area is changed depending on the length of the intersecting line. Accordingly, when the length of the intersecting line is adjusted (changed), the press-in load can be set to a proper level so as not to generate the cracks in the needle sheath part and the needle can be assuredly attached to the rotating shaft.

In order to achieve the above-described object, a meter device according to the present invention is characterized by below-described (3) and (4).

(3) In a meter device comprising:
a display plate;
a rotating shaft that has an end part protruding to a front surface side from the display plate and rotates by a turning force transmitted from a motor through a gear;
a needle that has in a lower surface a press-in hole to which a press-in part in the end part side of the rotating shaft is pressed-in and rotates along the front surface side of the display plate; and
a light source that is provided in a back surface side of the display plate and outputs an illuminating light advancing in the rotating shaft from a base end part to the end part to emit the light from the needle, the rotating shaft having light guide characteristics is pressed-in to the press-in hole of the needle, the press-in hole has a true circular form in section, the press-in part in the end part side of the rotating shaft has a regular n polygonal form in section (in this case, 5≤n), when the press-in part is pressed-in to the press-in hole, a vertex of the press-in part deformed to a form along the inner surface of the press-in hole comes into contact with the inner surface of the press-in hole and a press-in force when the press-in part is inserted into the press-in hole or a pull-out force when the press-in part is pulled out from the press-in hole is set in according with the length of an intersecting line that a surface on which the outer surface of the press-in part comes into contact with the inner surface of the press-in hole and a section intersecting orthogonally to the axial direction of the press-in part intersect.

(4) In a meter device having the structure of (3), the length of the intersecting line is set in accordance with at least one of the diameter of the inner surface of the press-in hole, a length from an axis to the vertex of the press-in part and the number n of the vertexes of the press-in part.

According to the meter device described in the above-described (3) or (4), the light emitting efficiency of the needle is not seriously deteriorated because of the same reason, so that the illuminating light can be efficiently transmitted to the needle and the generation of the cracks can be prevented. Further, the length of the intersecting line is adjusted (changed), so that the press-in load can be set to a proper level so as not to generate the cracks in the needle sheath part and the needle can be assuredly attached to the rotating shaft.

According to the needle attaching structure of the rotating shaft and the meter device of the present invention, the space between the press-in part and the press-in hole can be more reduced than, for instance, a case of a triangular form in section. Accordingly, the light emitting efficiency of the needle is not seriously deteriorated by the leakage of the light from the space, so that the illuminating light can be efficiently transmitted to the needle. Further, since the press-in part has a structure that only a rather large number of angular parts of a polygonal form respectively come into contact with the press-in hole, differently from the press-in part of the true circular form in section which comes into contact with the press-in hole in an entire peripheral surface or the press-in part of a triangular form in section which concentrically comes into contact with the press-in hole at a small number of parts such as three angular parts, a large press-in load can be avoided from being concentrically applied to the press-in hole. Thus, even in the needle made of a synthetic resin and having a relatively low strength, the cracks can be advantageously prevented from being generated in the press-in hole.

Further, the press-in load of the rotating shaft to the press-in hole is proportional to the contact area thereof, and the contact area is changed depending on the length of the intersecting line in which each vertex of the rotating shaft comes into contact with the inner peripheral surface of the press-in hole. Accordingly, when the length of the intersecting line is adjusted (changed), the press-in load can be preferably set to a proper level so as not to generate the cracks in the needle sheath part and the needle can be advantageously assuredly attached to the rotating shaft.

The present invention is briefly described above. Further, an exemplary embodiment for embodying the present invention will be read by referring to the attached drawings to more clarify a detail of the present invention.

DETAILED DESCRIPTION

Now, an exemplary embodiment of the present invention will be described below in detail by referring to the attached drawings.

Figure 1:
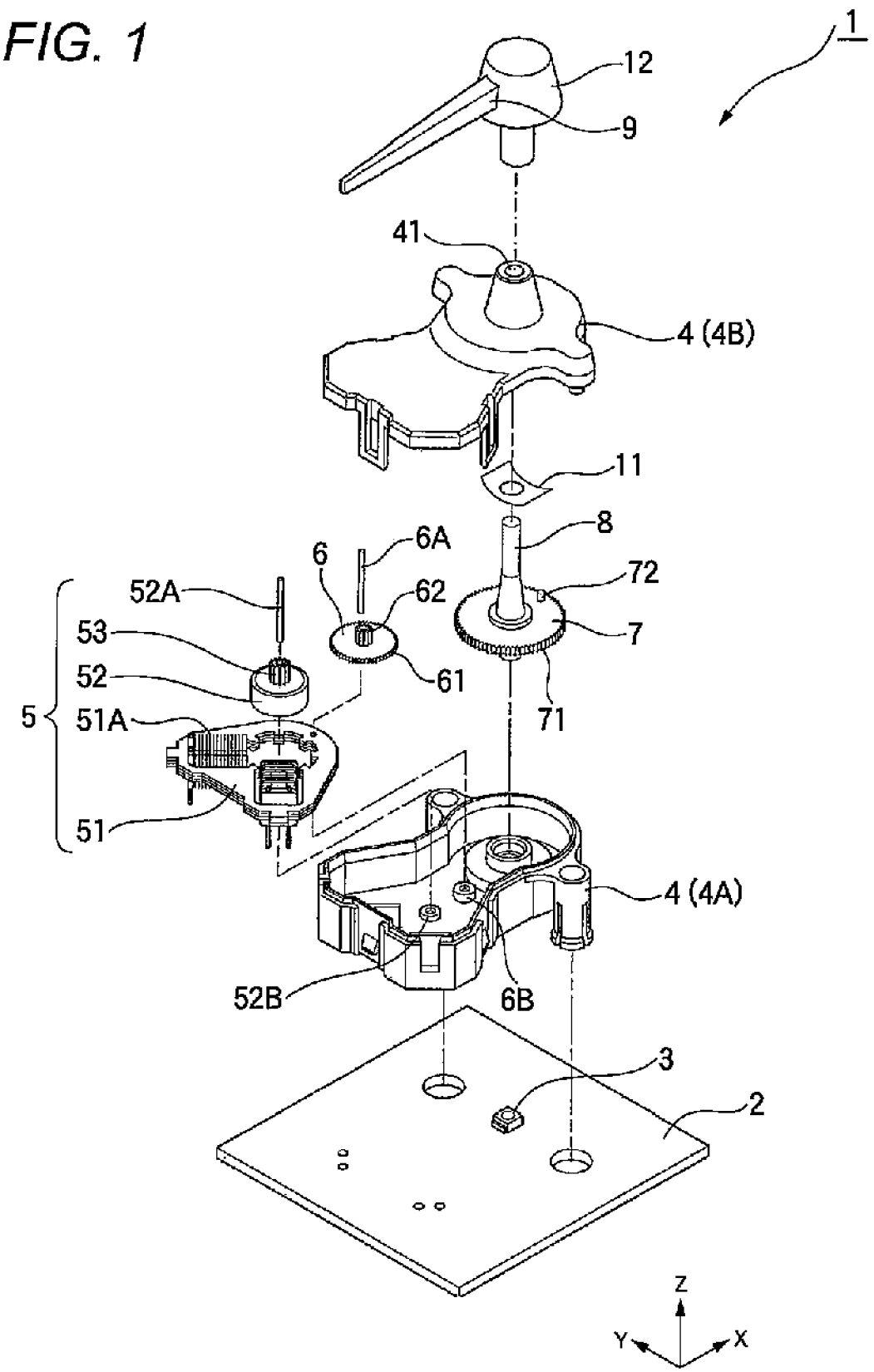
FIG. 1 is an exploded perspective view showing a meter device to which a needle attaching structure of a rotating shaft according to an exemplary embodiment of the present invention is applied.
Figure 2:
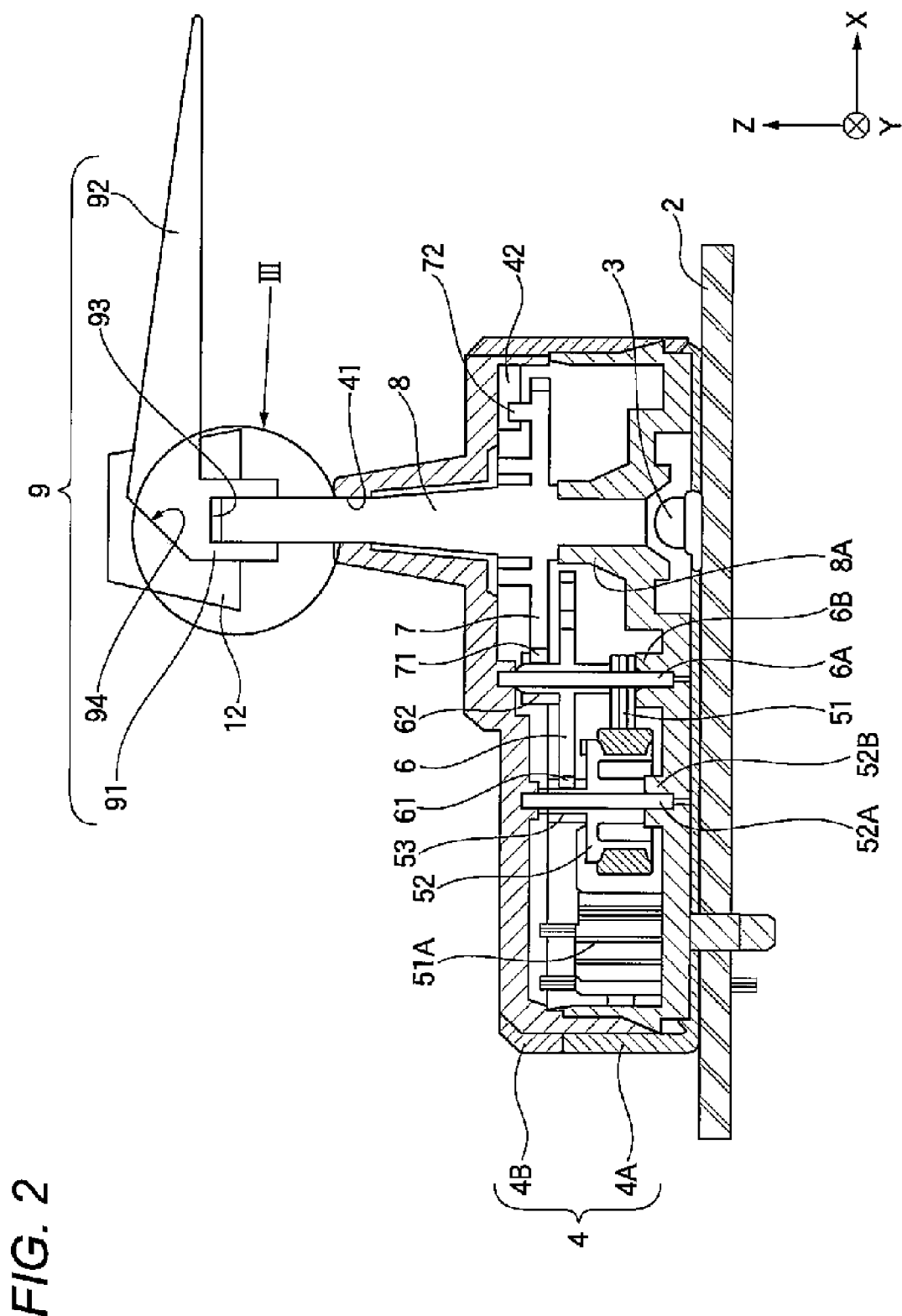
FIG. 2 is a sectional view of the meter device.

FIGS. 1 and 2 show a meter device 1 having a rotating shaft to which a needle attaching structure of the present invention is applied.

The meter device 1 includes a light source 3 mounted on a substrate 2, a meter case 4 attached to a prescribed position on the substrate 2 including an area where the light source 3 is mounted and a display plate not shown in the drawing that is arranged on the meter case 4 and displays necessary information about a vehicle itself or an environment in the periphery of the vehicle such as numeric characters, characters, signs or the like.

The meter device 1 of the present exemplary embodiment forms a part of a combination meter not shown in the drawing. The display plate forming a front surface side is fitted to an entire surface to form a reverse plate. Further, in the display plate, various kinds of display windows are opened for installing various kinds of meters including the meter device 1 and formed integrally with a combination meter case forming side surface and back surface sides. Further, the display plate has an upper part covered with a transparent cover glass of a black color that is not shown in the drawing.

The meter device 1 of the present exemplary embodiment forms a speed meter, and a needle 9 is rotated by a prescribed angle in accordance with a sensor signal corresponding to a present speed detected by a sensor not shown in the drawing to indicate a specific numeric character formed in the display plate not shown in the drawing. Thus, the present speed is analog displayed.

The light source 3 of the present exemplary embodiment is formed with, for instance, an LED (Light Emitting Diode) for outputting a visible light of a prescribed wavelength ($\lambda$). As a light (refer it to as an illuminating light, hereinafter) outputted from the light source 3, the illuminating light is used that has no dependence on a direction over a phase angle of 360° and uniform output characteristics. Namely, the light source 3 of the present exemplary embodiment has light quantity distribution characteristics that output a substantially uniform quantity of light to a rotating shaft 8 over an entire circumference with respect to a horizontal plane (a X-Y plane).

The light source 3 of the present exemplary embodiment is not especially limited to the LED, and a compact point light source whose consumed electric power is low is preferable.

The meter case 4 includes a lower case 4A fixed to the substrate 2 and an upper case 4B laminated on and screwed to the lower case 4A. In the meter case 4, the rotating shaft 8 is provided that has a motor 5, an intermediate gear 6 and an output gear 7 integrally formed. To an end part (refer it also to as an "upper end part", hereinafter) of the rotating shaft 8 partly protruding outside the meter case 4, a needle 9 is pressed-in. In the rotating shaft 8, a brake spring 11 is interposed.

The motor 5 serves to rotate the needle 9 and rotates the rotating shaft 8 through the intermediate gear 6 and the output gear 7 to rotate the needle 9 along the surface of the display plate and indicate various kinds of necessary information. The motor 5 of the present exemplary embodiment includes a stator 51 made of a suitable electrically conductive material and a rotor 52 attached to a rotor shaft 52A in an opened inner part of the stator 51, and forms a stepper motor.

The stator 51 is fixed to the lower case 4A, a magnetic core as a magnetic pole protrudes in the opened inner part and a coil 51A wound on a bobbin is attached to the magnetic core.

The rotor 52 is configured in a substantially cylindrical form by a suitable magnetic material and provided in the opened inner part of the stator 51 so as to freely rotate. To an upper part of the rotor, a rotor gear 53 is coaxially fixed. The rotor shaft 52A to which the rotor 52 is attached is supported by a bearing 52B (see FIG. 2) provided in the lower case 4A so as to freely rotate.

The intermediate gear 6 is fixed to a support shaft 6A and the support shaft 6A is supported by a bearing 6B provided in the lower case 4A so as to freely rotate. In the intermediate gear 6, a large gear 61 having the large number of teeth provided in an outer periphery mesh with the rotor gear 53 having the small number of teeth provided in the upper part of the rotor 5, so that a rotating speed (a turning force) from the rotor 52 is decelerated and transmitted to the intermediate gear 6. Further, to the intermediate gear 6, a pinion 62 having the small number of teeth and a small diameter is fixed coaxially and integrally with the support shaft 6A.

The output gear 7 is formed integrally with the rotating shaft 8 in an intermediate part of the rotating shaft 8 to transmit the turning force from the pinion 62 of the intermediate gear 6 to the rotating shaft 8. Especially, the output gear 7 is formed with a suitable resin material excellent in its light guide characteristics in order to avoid a part of the illuminating light incident from the light source 3 facing a base end part (refer it to as a "lower end part", hereinafter) of the below-described rotating shaft 8 that advances to the output gear 7 from being damped or absorbed in the output gear 7.

Further, in the output gear 7, in order to suppress a surface area of a connecting part to the rotating shaft 8 to a minimum value as low as possible, a thickness (t) of the output gear 7 is reduced to a value as small as possible under a condition that a prescribed strength is assured. Thus, a structure is obtained that a loss of the illuminating light due to the advancement of the light from the rotating shaft 8 to the output gear 7 can be suppressed to a minimum level. On an upper surface of the output gear 7, an initial position setting pin 72 stands upright that is engaged with a stopper surface 42 (see FIG. 2) of the upper case 4B.

Further, in the output shaft 7, a large gear 71 having the large number of teeth provided on an outer periphery meshes with the pinion 62 provided on an upper part of the intermediate gear 6, so that the rotating speed of the intermediate gear 6 is more decelerated and transmitted to the output gear 7 to rotate the output gear 7. The rotating shaft 8 in contact with the output gear 7 is rotated integrally with the output gear 7 whose rotating speed is greatly decelerated at the same angular velocity.

The rotating shaft 8 is configured in a solid and substantially cylindrical shape formed integrally with the output gear 7 by a suitable light transmitting resin material excellent in its light guide characteristics. Further, as described above, in the rotating shaft 8, the upper end part side protrudes to an outer part of the meter case 4 from a shaft hole 41 of the upper case 4B and protrudes on the surface of the display plate. In the rotating shaft 8, to the upper end part, the needle 9 is attached, and the lower end part is supported by a bearing 8A provided in the lower case 4A so as to freely rotate.

Further, a lower end surface of the rotating shaft 8 is provided to be located just above the light source 3 as shown in FIG. 2. When the illuminating light from the light source 3 is incident thereon, the illuminating light is guided in the rotating shaft 8 and transmitted to the upper end part. Accordingly, in the rotating shaft 8, in an interface part of an inner part and an outer peripheral surface, most of the illuminating lights are reflected (for instance, a regular reflection or a total reflection or the like) to advance to the upper end part.

Figure 3:
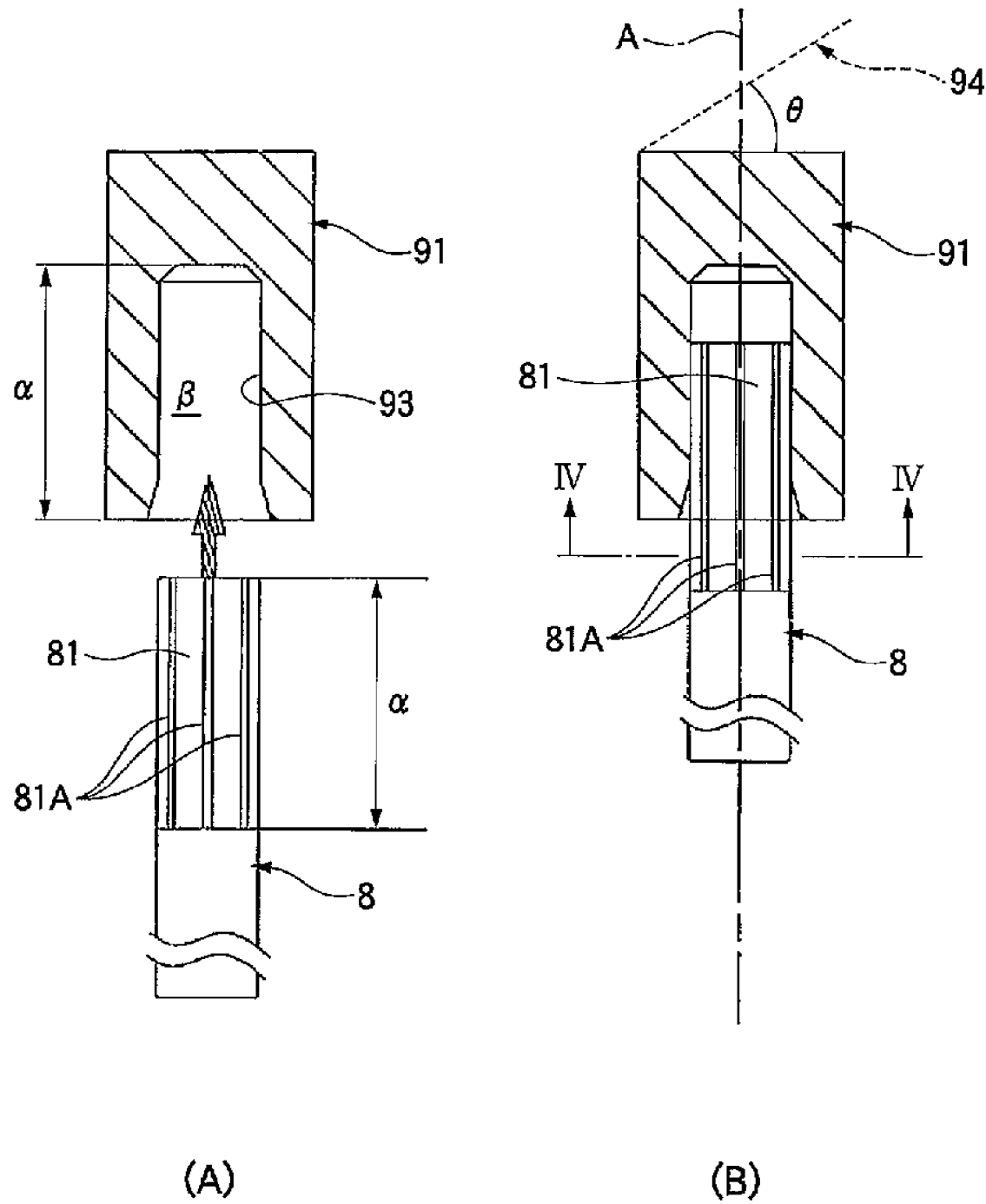
FIG. 3(A) is an explanatory view showing a state before a press-in part in the meter device shown in FIG. 2 is pressed-in to a press-in hole.
FIG. 3(B) is an explanatory view showing a state after the pressing-in operation.
Figure 4:
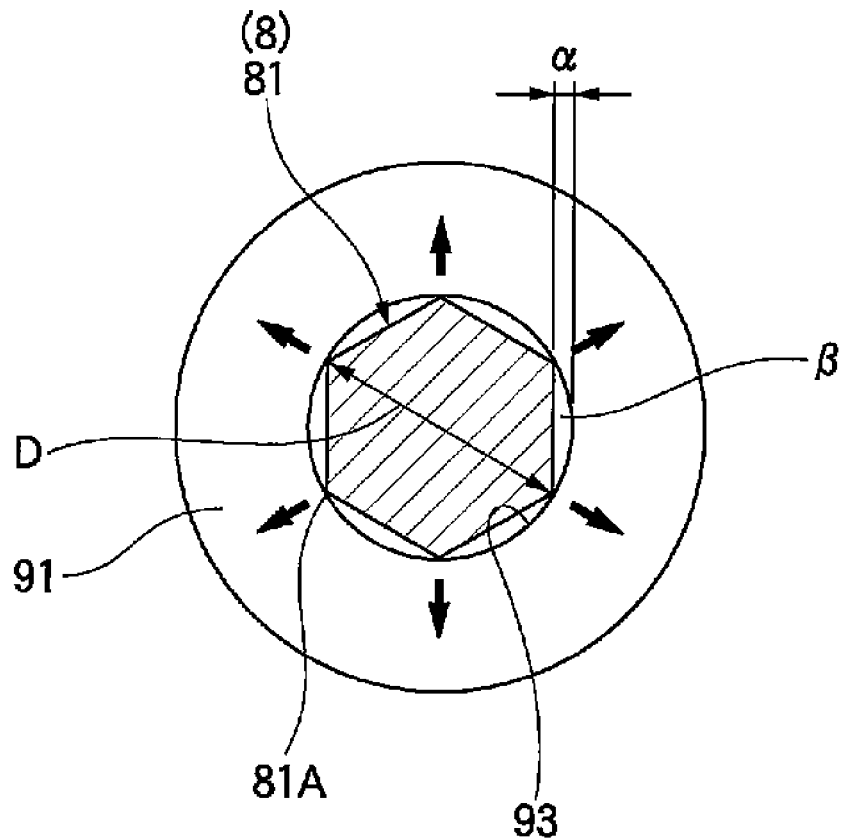
FIG. 4 is a sectional view taken along a line IV-IV in FIG. 3(B).

Further, the rotating shaft 8 has, as shown in FIG. 3, from the upper end of the rotating shaft 8, a press-in part 81 formed with a section of a polygonal form by at least a length a corresponding to the depth a of a below-described press-in hole 93 of the needle 9. The press-in part 81 in the present exemplary embodiment has a section of a regular hexagonal form as shown in FIG. 4. If the light leaks from the press-in part 81 to an outer part, that is, a space β facing the press-in hole 93 of the needle 9, since the width of the space is small, a quantity of the leakage of the light can be suppressed to a level as low as possible.

Further, in the press-in part 81, at least a maximum diagonal line of the regular hexagonal form in section before the press-in part is allowed to be pressed-in to the press-in hole has a dimension slightly larger than a diameter D of the press-in hole 93 before the press-in part is pressed-in to the press-in hole. Here, the "maximum diagonal line" is geometrically defined as a diagonal line having a maximum length for connecting together two regularly opposed vertexes of two mutually opposed vertexes, specifically, the two vertexes separated with a central angle of 180° in the case of the regular hexagonal form.

In the present exemplary embodiment, a sectional form of the press-in part 81 is configured in the regular hexagon, however, the sectional form is not especially limited thereto. An n polygonal form in section may be used in which the number n of side parts and angular parts (vertexes) is located within a range expressed by 3≤n≤10, and especially, the number n of the side parts and the angular parts is preferably located within a range expressed by 6≤n≤8. As described above, in the present exemplary embodiment, the sectional form of the press-in part 81 is configured to be a sectional form in which the number n of the side parts and the angular parts (the vertexes) is located within the range expressed by 6≤n≤8 and to be a polygonal form in section in which the number of the vertexes is large to some degree. Thus, when the press-in part is pressed-in to the press-in hole 93 of the needle 9, a stress by angular parts (parts corresponding to the vertexes of the regular hexagonal form) 81A of the press-in part 81 can be distributed as much as possible and an unevenness in the stress by the angular parts 81A can be reduced as much as possible. A scattered light or the leakage of light caused by a below-described space (see FIG. 4) between the press-in part 81 and the press-in hole 93 is restrained from occurring.

The needle 9 includes a needle sheath part (hub) 91 with the press-in hole 93 formed to which the rotating shaft 8 is pressed-in, a deflecting surface 94 formed in a boundary part to the needle sheath part 91 and a pointer part 92 for indicating a design part such as a scale, and is integrally formed with a suitable resin material having suitable light guide characteristics. Thus, the illuminating light guided from the rotating shaft 8 is guided to the needle sheath part 91 and the pointer part 92. Further, a head part (an upper part) of the needle sheath part 91 of the needle 9 is covered with a cap 12.

The press-in hole 93 of the needle sheath part 91 is opened to a lower surface of the needle sheath part 91, and its sectional form is substantially circular (especially, a true circular form). The needle sheath part 91 has a prescribed dimension of an inside diameter in which the angular parts 81A respectively come into contact with the press-in hole 93 when the press-in part 81 of the rotating shaft 8 is pressed-in to the press-in hole 93. Namely, the inside diameter D of the press-in hole 93 of the present exemplary embodiment is dimensionally worked so that the inside diameter D is slightly smaller than a dimension of the maximum diagonal line for connecting together the regularly opposed angular parts 81A of the press-in part 81 of the rotating shaft 8.

The deflecting surface 94 of the pointer part 92 serves to deflect the optical paths of most of the illuminating lights incident on the needle sheath part 91 through the press-in hole 93 from the upper part of the rotating shaft 8 and advance the illuminating lights to the pointer part 92. As shown in FIG. 3(B), the deflecting surface 94 is formed by an inclined surface inclined by a prescribed angle ⊖ (for instance, 45°) with respect to a central axis A of the rotating shaft 8 and the press-in hole 93 of the needle sheath part 91.

The cap 12 is provided to avoid the light from the light source 3 from being directly incident on the eye of a person who visually recognizes a display. Even when the illuminating light passing through the needle sheath part 91 passes through the needle sheath part 91 to be incident on the cap 12, the illuminating light is absorbed by the cap to prevent the illuminating light from being directly transmitted upward. Since most of the illuminating lights advancing in the needle sheath part 91 are not incident on the cap 12 and the optical path thereof is deflected by the deflecting surface 94, the illuminating lights can be effectively moved forward to the pointer part 92.

Now, an operation of the present exemplary embodiment will be described below. Here, in the description of the meter device 1, the speed meter of various meters is exemplified and an operation thereof is described, however, the present invention is not especially limited thereto. The operation is the same as that of other analog type meter device.

The motor 5 provided in the meter case 4 of the meter device 1 is rotated and driven in accordance with the sensor signal corresponding to the present speed detected by the sensor not shown in the drawing to rotate the needle not shown in the drawing by a prescribed angle and indicate a specific numeric character formed on the display plate not shown in the drawing.

Namely, in the meter device 1 of the present exemplary embodiment, the sensor signal corresponding to the speed detected by the sensor not shown in the drawing is transmitted to the coil 51A of the stator 51 side shown in FIG. 1 to generate a magnetic force in the magnetic core as each magnetic pole and the rotor 52 is rotated by the magnetic force.

Thus, as shown in FIG. 2, the turning force is decelerated and transmitted to the large gear 61 of the intermediate gear 6 from the rotor gear 53 formed integrally with the rotor 52 to rotate the intermediate gear 6 and the support shaft 6A supporting the intermediate gear 6 at a prescribed angular velocity. Then, from the pinion 62 of the rotating intermediate gear 6, the turning force is more decelerated and transmitted to the output gear 7 and the rotating shaft 8 to rotate the output gear 7 and the rotating shaft 8 formed integrally therewith at a prescribed angular velocity. Thus, the needle 9 attached to the upper end part of the rotating shaft 8 is rotated by a prescribed angle to indicate the specific numeric character on the display plate by an end part of the pointer part 92 of the needle 9. Thus, the present speed can be analog displayed to inform a driver of the present speed.

On the other hand, in the meter device 1 that displays the speed, the illuminating lights substantially equally outputted over an entire circumference of 360° from the light source 3 enter from an incident surface as the lower end part of the rotating shaft 8 arranged just above the light source 3, as shown in FIG. 2. Thus, most of the illuminating lights incident on the rotating shaft 8 from the incident surface are repeatedly reflected in the interface part of the inner part and the outer peripheral surface of the rotating shaft 8 and advance upward in the rotating shaft 8.

A part of the illuminating lights entering from the incident surface as the lower end part of the rotating shaft 8 may be occasionally incident on the inner part of the output gear 7 from the intermediate connecting part to the output gear 7, move forward and leak outside. However, since the thickness of the output gear 7 is reduced as much as possible, a phenomenon of the leakage of the light can be suppressed as much as possible.

As described above, the illuminating light repeats a transmission phenomenon that the illuminating light is incident on the outer peripheral surface in the inner part of the rotting shaft 8, similarly reflected and advance upward, and finally, is incident on an inner part of the needle sheath part 91 through the press-in hole 93 of the needle 9 from the upper end part of the rotating shaft 8. The illuminating light incident on the needle sheath part 91 further advances to the pointer part 92 formed integrally with the needle sheath part 91. The optical paths of most of the illuminating lights are deflected by the deflecting surface 94 so that the end part of the needle 9 and a part in the vicinity thereof can be lighted by emitting the light. It is to be understood that such a transmitting operation of the illuminating light in the rotating shaft 8 is carried out even during the rotating operation of the rotating shaft 8 without a change as in the case of a stationary state except that the optical path is rotated spirally upward.

While the illuminating lights are moving forward in the rotating shaft 8, a part of the lights may possibly leak in the connecting part to the output gear 7, however, in the present exemplary embodiment, the thickness f the output gear 7 is reduced as much as possible. Accordingly, a quantity of the light is suppressed that moves forward to the output gear 7 from the connecting part and leaks outside from the output gear.

Figure 5:
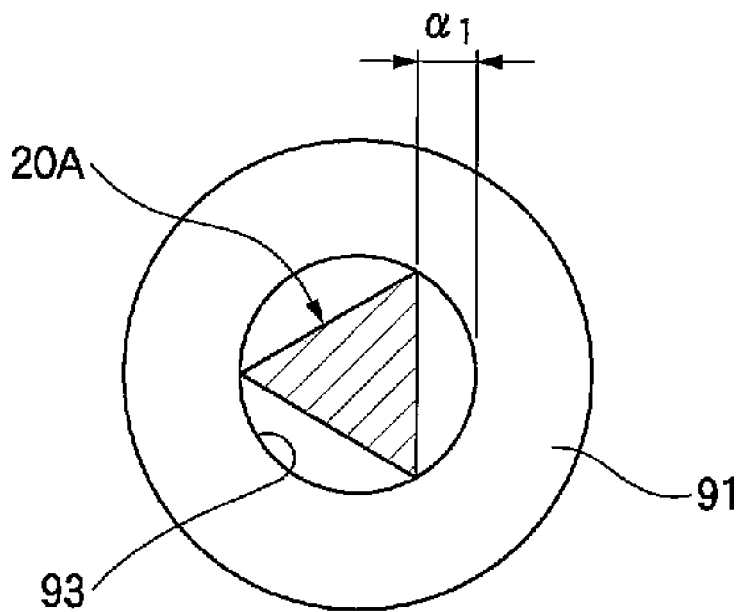
FIG. 5 is an explanatory view, in a comparative example, showing a state that a press-in part having a section of a triangular form is pressed-in to a press-in hole.

Therefore, according to the needle attaching structure of the rotating shaft 8 of the present exemplary embodiment, the press-in part 81 provided in the upper part of the rotating shaft 8 is configured in the regular hexagonal form in section. Accordingly, the space between the press-in part 81 of the rotating shaft 8 and the press-in hole 93 of the needle sheath part 91 in the present exemplary embodiment is more greatly reduced than a space between a press-in part of a rotating shaft 20A and a press-in hole 93 of a needle sheath part 91 in the case of a needle attaching structure using the rotating shaft 20A having the press-in part of an equilateral triangular form in section as in a comparative example shown in FIG. 5. A rate of the illuminating light leaking from the space is the more suppressed and a light transmitting efficiency can be improved.

Figure 6:
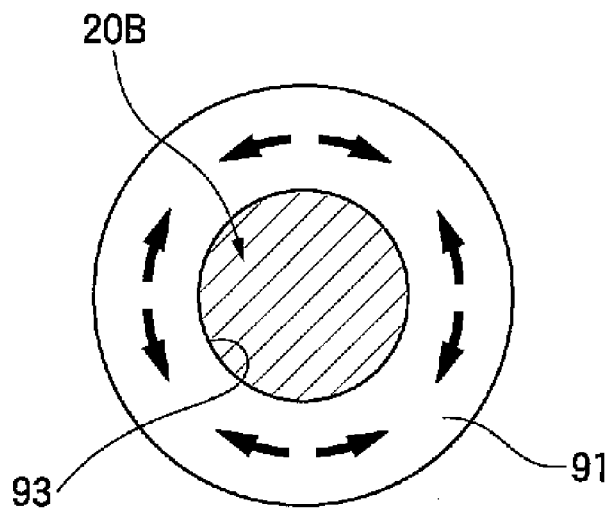
FIG. 6 is an explanatory view, in another comparative example, showing a state that a press-in part having a section of a true circular form is pressed-in to a press-in hole.

Further, for instance, as a comparative example shown in FIG. 6, when a press-in part in an upper end side of a rotating shaft 20B has a true circular form in section and has an outside diameter gradually increased toward a lower end part, a large press-in force is necessary during a press-in work and a high working accuracy is required for the press-in part of the rotating shaft 20B and a press-in hole 93 of a needle sheath part 91. As a result, there is a fear that a tolerance is hardly managed, which is apt to cause a cost to increase. Further, in this case, there is a fear that such a stress as to pull the needle sheath part 91 in the circumferential direction shown by arrow marks acts to generate cracks.

On the other hand, according to the needle attaching structure of the rotating shaft 8 of the present exemplary embodiment, the rotating shaft 8 or the needle 9 is formed with a synthetic resin by considering the light guide characteristics. When the rotating shaft 8 or the needle 9 is formed with the resin, the working accuracy is lower than that when the rotating shaft or the needle is formed with metal. By considering such circumstances, the press-in part 81 of the rotating shaft 8 is configured in the regular hexagonal form in section. Accordingly, even when there is an unevenness in work to some degree in the press-in part 81 of the rotating shaft 8 or the press-in hole 93 of the needle sheath part 91, since only the angular parts 81A of the press-in part 81 partly come into contact with an inner peripheral surface of the press-in hole 93, the angular parts 81A operate just like a guide so that the press-in part 81 is merely pressed in to the press-in hole 93 along the angular parts. Thus, the large press-in force is not necessary during the press-in work. Namely, since contact points of the angular parts 81A serve to press and bend the press-in hole 93 outward in the radial direction as shown in arrow marks, the generation of the cracks is prevented.

Further, according to the present exemplary embodiment, as shown in FIG. 4, a press-in structure is used in which the angular parts 81A of the press-in part 81 are distributed at equal intervals to come into contact with the press-in hole so that the angular parts 81A of the press-in part 81 iso-metrically come into contact with the inner peripheral surface of the pressure-in hole 93 at regular intervals of 60°. Accordingly, a stress is avoided from being partly and excessively concentrated and the generation of the cracks in the needle 9 can be effectively suppressed.

Further, according to the present exemplary embodiment, since the press-in part 81 of the rotating shaft 8 is configured in the regular hexagonal form in section, in other words, the sectional form of the press-in part 81 avoids a structure of a polygonal form having too many side parts and angular parts. Accordingly, the occurrence of irregular reflection due to many scattered lights of leaking lights in the space between the press-in part 81 and the press-in hole 93 can be prevented. Thus, a calm and moderate lighting effect can be the more realized without a glare of high luminance.

As described above, in the sectional form of the press-in part 81 having the polygonal form, the number n of the side parts and the angular parts 81A is located within a range expressed by $3 \leq n \leq 10$, and preferably located within a range expressed by $6 \leq n \leq 8$. In this case, the angular parts 81A of the press-in part 81 respectively reduce the unevenness in the stress applied to the inner peripheral surface of the press-in hole 93 in the needle sheath part 91, so that the stress can be avoided from being concentrated on a part of the inner peripheral surface of the press-in hole 93. Accordingly, the stress is averaged in all the inner peripheral surface of the press-in hole 93 and the press-in force of the press-in part 81 to the press-in hole 93 can be adjusted to a suitable level so as not to cause damage such as the cracks in the needle sheath part 91.

Further, the illuminating lights passing through the rotating shaft 8 can be restrained from being scattered or leaking, which is caused by the space between the press-in part 81 and the press-in hole 93. A below-described effect can be anticipated as well as the above-described effects. Namely, the number of the angular parts 81A of the press-in part 81 is increased or decreased to change a length of a circumference of a fitting part in the angular part 81A of the rotating shaft 8 to the needle sheath part 91. Thus, the press-in force of the rotating shaft 8 to the press-in hole 93 can be adjusted. When the press-in force is properly adjusted, the cracks can be avoided from being generated in the needle sheath part 91.

Figure 7:
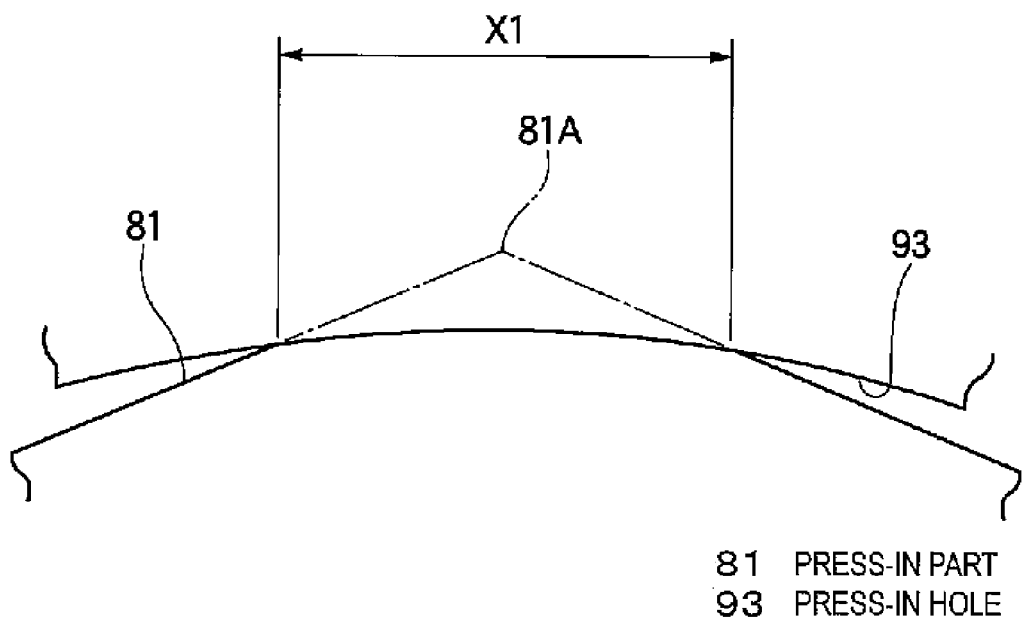
FIG. 7 is an explanatory view showing a length of a circumference of a fitting part of the rotating shaft and a sheath part of a needle in the exemplary embodiment of the present invention.

By referring to FIGS. 7 and 8, a method for adjusting the press-in force will be described below. FIG. 7 shows a case that a regular hexagonal pole shaped rotating shaft 8 having six angular parts 81A (the number n of the angular parts 81A is expressed by n=6) in the press-in part 81 is connected to the needle sheath part 91. In this case, the press-in part 81 of the rotating shaft 8 is inserted into the press-in hole 93 of the needle sheath part 91. Here, a case is described in which a material of the needle sheath part 91 is a little harder than a material of the rotating shaft 8.

As shown in FIG. 7, a case is considered that the angular part 81A of the press-in part 81 is larger than the inside diameter of the press-in hole 93, namely, a case that when an axis of the rotating shaft 8 and an axis of the needle sheath part 91 are arranged on the same straight line, the vertex of the angular part 81A of the press-in part 81 is located outside an inner surface that defines the press-in hole 93 of the needle sheath part 91. As shown in FIG. 3, in order to improve an easy insertion of the press-in part 81 into the press-in hole 93, a lower end of the press-in hole 93 near the opening of the inner surface is tapered. The inside diameter of the press-in hole 93 indicates an inside diameter in an upper end located at a position deeper than the tapered lower end.

In this case, when the press-in part 81 is inserted into the press-in hole 93, the angular part 81A of the press-in part 81 comes into contact with the inner surface of the press-in hole 93 formed to be tapered as shown in FIG. 3. Here, when the press-in part 81 is pressed-in to the press-in hole 93, the angular part 81A of the press-in part 81 is collapsed by the inner peripheral surface of the press-in hole 93. The collapsed part (a part shown by a chain line in FIG. 7 corresponds to the collapsed part) is expanded along the inner surface of the press-in hole 93 (along a circular arc surface in section) in both sides (right and left sides in the drawing) of a contact part of the press-in part 81 and the press-in hole 93. Since an external force for deforming the press-in part 81 is required and a frictional force between the outer surface of the press-in part 81 and the inner surface of the press-in hole 93 is large in accordance with the deformation, the press-in force necessary for inserting the press-in part 81 into the press-in hole 93 is more increased as the press-in part 81 is more deeply inserted.

Figure 8:
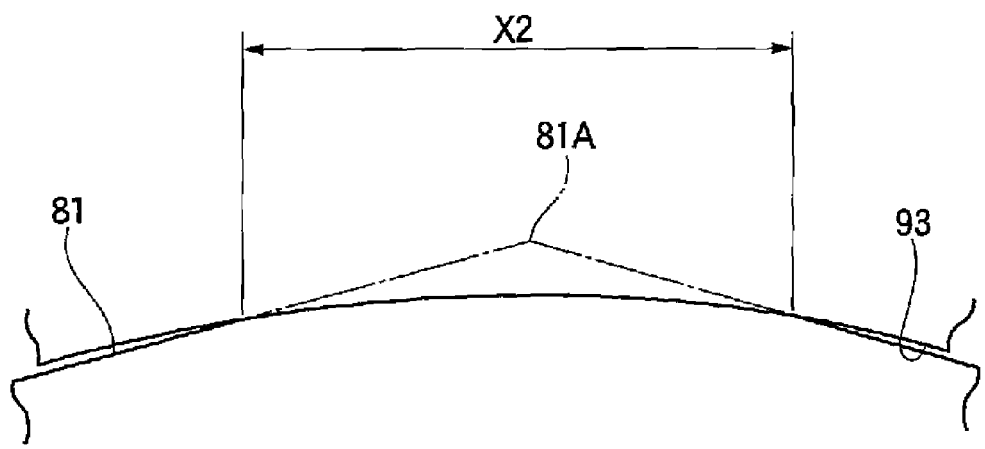
FIG. 8 is an explanatory view showing another length of the circumference of the fitting part of the rotating shaft and the sheath part of the needle in the exemplary embodiment of the present invention.
Figure 9:
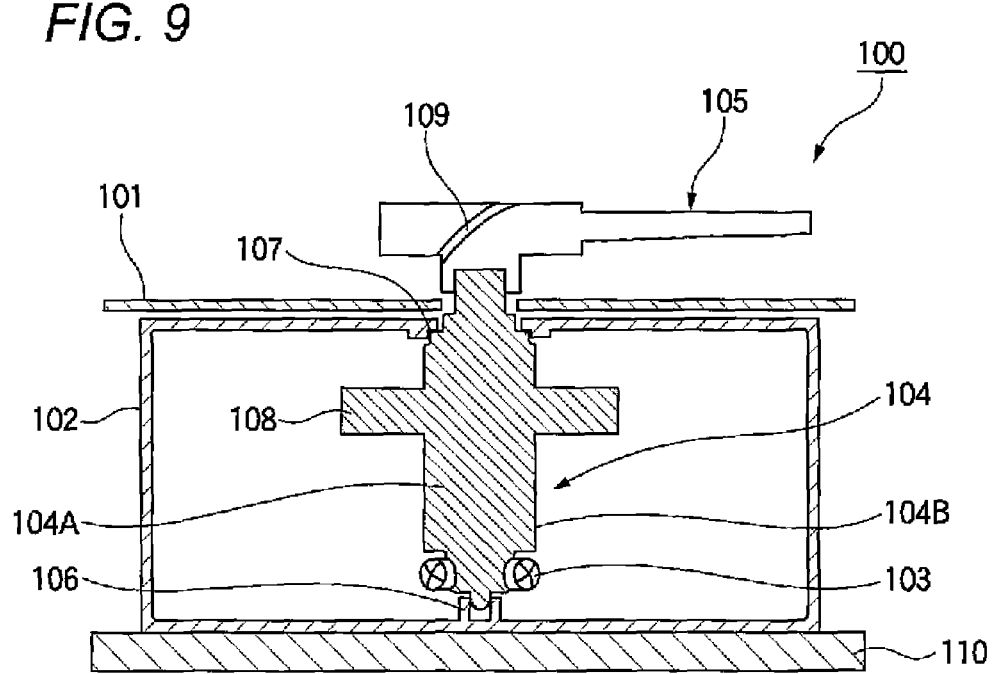
FIG. 9 is a sectional view of a meter device using a usual needle attaching structure.
Figure 10A:
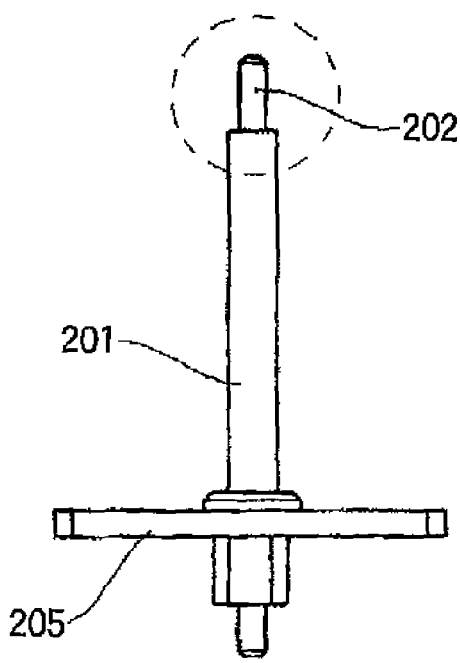
FIG. 10(A) is an explanatory view showing a rotating shaft to which another usual needle attaching structure is applied and FIG. 10(B) is an enlarged view of main parts thereof.
Figure 10B:
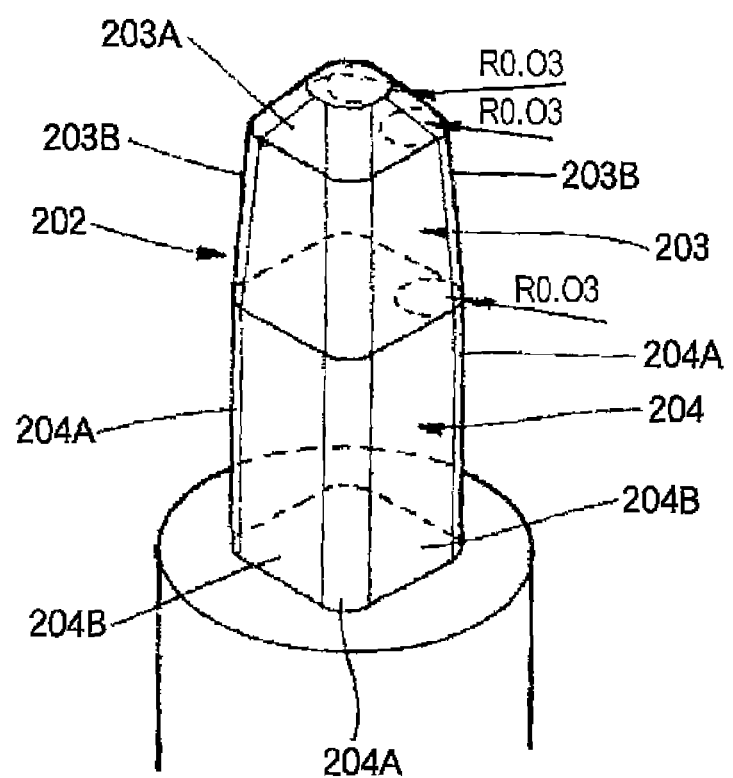
Figure 11:
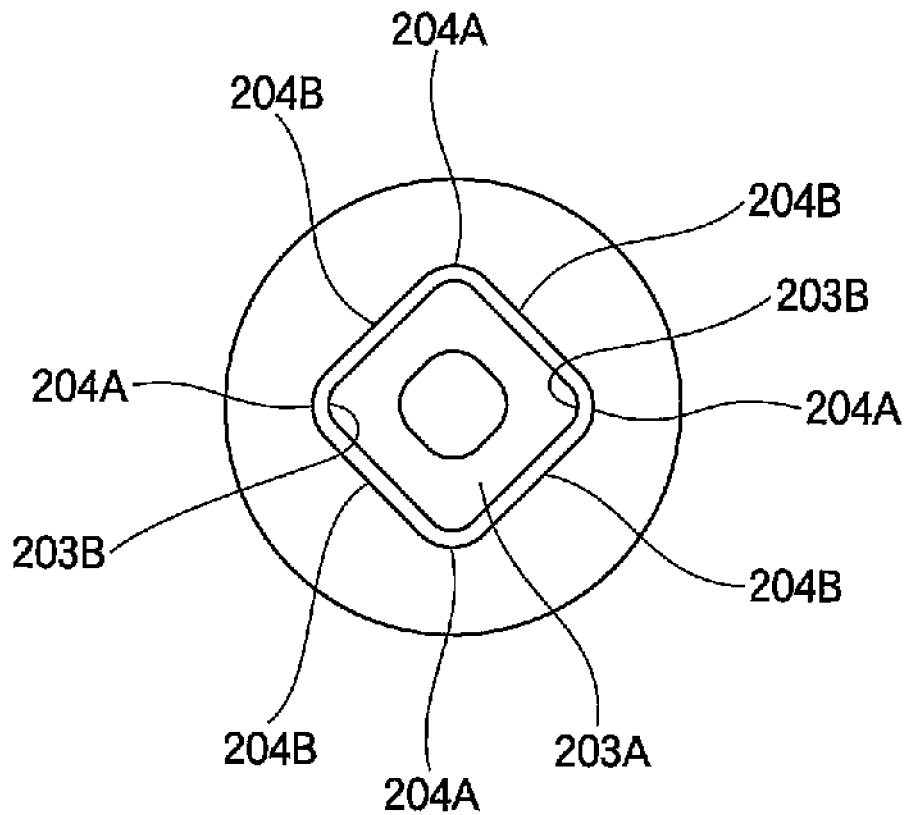
FIG. 11 is a plan view of FIG. 10(B).
Figure 12:
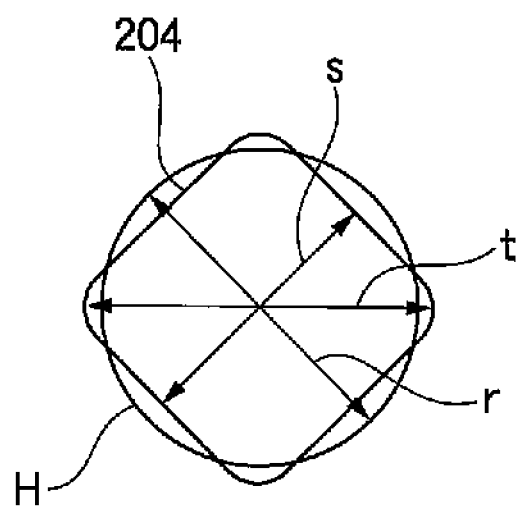
FIG. 12 is an explanatory view showing a relation of sizes of a fitting part of the rotating shaft shown in FIG. 10 and an attaching hole.

Here, as described above, the length of the position where the angular part 81A of the rotating shaft 8 is collapsed to come into contact with the inner surface of the press-in hole 93 along the circular arc surface is defined as the "length of the circumference of the fitting part" (see X1 in FIG. 7 and X2 in FIG. 8). More specifically, the length of the position along the circular arc surface is defined as a length of an intersecting line that a surface on which the outer surface of the press-in part 81 comes into contact with the inner surface of the press-in hole 93 and a section intersecting orthogonally to the axial direction of the press-in part 81 intersect. A dimension of the length of the circumference of the fitting part corresponds to the size of a contact area of the press-in part 81 of the rotating shaft 8 and the press-in hole 93 of the needle sheath part 91. As a result, the length of the circumference of the fitting part may give an influence to the level of the press-in force necessary for inserting the press-in part 81 into the press-in hole 93 (a study, will be described below, of a relation between the size of the contact area of the press-in part 81 of the rotating shaft 8 and the press-in hole 93 of the needle sheath part 91 and the level of the press-in force necessary for inserting the press-in part 81 into the press-in hole 93). Accordingly, when the length of the circumference of the fitting part of the collapsed part is adjusted to a suitable dimension, the press-in force can be set to a proper press-in force in which the cracks or damage are not generated in the needle sheath part 91 and a proper holding force can be provided by which the needle sheath part 91 does not slip out from the rotating shaft 8 after the press-in part 81 is inserted in to the press-in hole 93.

FIG. 8 shows a case that a rotating shaft 8 of a regular octagonal form in section (an octagon pole) having eight angular parts 81A more than the number of the angular parts 81A of the rotating shaft 8 shown in FIG. 7 (the number n of the angular parts 81A is expressed by n=8) is connected to the needle sheath part 91. In this case, when the press-in part 81 is inserted into the press-in hole 93, the angular part 81A of the press-in part 81 comes into contact with the inner surface of the press-in hole 93 formed to be tapered as shown in FIG. 3. Here, when the press-in part 81 is pressed-in to the press-in hole 93, the angular part 81A of the press-in part 81 is collapsed by the inner peripheral surface of the press-in hole 93. The collapsed part (a part shown by a chain line in FIG. 8 corresponds to the collapsed part) is expanded in both sides (right and left sides in the drawing) of a contact part of the press-in part 81 and the press-in hole 93 along a circular arc surface of the press-in hole 93. Since an external force for deforming the press-in part 81 is required and a frictional force between the outer surface of the press-in part 81 and the inner surface of the press-in hole 93 is increased in accordance with the deformation, the press-in force necessary for inserting the press-in part 81 into the press-in hole 93 is more increased as the press-in part 81 is more deeply inserted.

As understood from the comparison of FIG. 7 with FIG. 8, when the number of the angular parts 81A of the rotating shaft 8 is increased, the length of the circumference of the fitting part is more increased (X2>X1). In such a way, even when a maximum radius of the rotating shaft 8 (a length to the angular part 81A from an axis) is not changed, if the number of the angular parts 81A is increased or decreased, the length of the circumference of the fitting part can be adjusted. This means that when the number of the angular parts 81A is increased or decreased, the press-in force necessary for pressing-in the rotating shat 8 to the press-in hole 93 can be adjusted.

As shown in FIG. 4, the present invention has the press-in structure in which the angular parts 81A of the press-in part 81 are distributed at equal intervals to come into contact with the press-in hole so that the angular parts 81A of the press-in part 81 iso-metrically come into contact with the inner peripheral surface of the pressure-in hole 93 at regular intervals of 60°. Accordingly, a stress is avoided from being partly and excessively concentrated and the generation of the cracks in the needle 9 can be effectively suppressed. In addition thereto, the length of the circumference of the fitting part of the collapsed part of the rotating shaft 8 can be adjusted by the number of the angular parts 81A so that the press-in force necessary for pressing-in the rotating shaft 8 to the press-in hole 93 may be adjusted.

As described in the examples compared by referring to FIGS. 7 and 8, in order to adjust the length of the circumference of the fitting part, the number of the angular parts 81A of the rotating shaft 8 is increased or decreased. It is to be understood that the length of the circumference of the fitting part can be adjusted by increasing or decreasing the maximum radius of the rotating shaft 8 (the length to the angular part 81A from the axis) or by increasing or decreasing the diameter of the press-in hole 93 of the needle sheath part 91.

Now, a relation between the size of the contact area of the press-in part 81 of the rotating shaft 8 and the press-in hole 93 of the needle sheath part 91 and the level of the press-in force necessary for inserting the press-in part 81 into the press-in hole 93 will be taken into consideration.

When the entire surface of the outer surface of the rotating shaft 8 having a circular section abuts on the inner surface of the press-in hole 93, assuming that a diameter of the rotating shaft is Ds, a fitting length (a length in a direction of depth where the rotating shaft 8 comes into contact with the press-in hole 93) is L, a contact face pressure is P and a coefficient of friction is μ, the press-in force F of the rotating shaft 8 to the needle sheath part 91 is expressed by an equation (1).

$$F = \pi \times Ds \times L \times P \times \mu \quad (1)$$

Here, since π×Ds×L indicates the contact area of the rotating shaft 8 and the needle sheath part 91, it is understood that the press-in force F is proportional to the contact area when the contact face pressure P is not changed.

It may be said from the equation (1) that the press-in force F is proportional to the contact area of the press-in part 81 of the rotating shaft 8 and the press-in hole 93 and the needle sheath part 91. Further, in the present exemplary embodiment in which the press-in part 81 comes into contact with the press-in hole 93 at the parts of the number of the angular parts 81A, since the contact area is expressed by (the number of the angular parts (81A)×(the length of the circumference of the fitting part)×(the fitting length), the press-in force F may be said to be proportional to the product of the number of the angular parts 81A and the length of the circumference of the fitting part.

As described above, since the number of the angular parts 81A is increased or decreased, the maximum radius of the rotating shaft 8 (the length to the angular part 81A from the axis) is increased or decreased or the diameter of the press-in hole 93 of the needle sheath part 91 is increased or decreased, so that the length of the circumference of the fitting part can be adjusted, the press-in force necessary for pressing-in the rotating shaft 8 to the press-in hole 93 can be adjusted by suitably increasing or decreasing these figures. For instance, as shown in FIGS. 7 and 8, if the length of the circumference of the fitting part is changed to X2 from X1 by increasing the number of the angular parts 81A of the rotating shaft 8 to 8 from 6, a press-in force F2 necessary for inserting the press-in part 81 of the rotating shaft 8 having eight angular parts 81A into the press-in hole 93 is (8/6)×(X2/X1) times as large as a press-in force F1 necessary for inserting the press-in part 81 of the rotating shaft 8 having six angular parts 81A into the press-in hole 93 (when it is assumed that a repulsion force due to the deformation of the rotating shaft 8 is fixed). Further, for instance, if the maximum radius of the rotating shaft 8 (the length to the angular part 81A from the axis) is increased or decreased or the diameter of the press-in hole 93 of the needle sheath part 91 is increased or decreased so that the length of the circumference of the fitting part is changed to X4 from X3, a press-in force F4 necessary for inserting the press-in part 81 of the rotating shaft 8 when the length of the circumference of the fitting part is X4 into the press-in hole 93 is (X2/X1) times as large as a press-in force F3 necessary for inserting the press-in part 81 of the rotating shaft 8 when the length of the circumference of the fitting part is X3 into the press-in hole 93 (when it is assumed that a repulsion force due to the deformation of the rotating shaft 8 is fixed).

The proper press-in force is to be set (adjusted) by considering the dimensional tolerance of the rotating shaft 8 and the needle sheath part 91 and the temperature change of a peripheral environment and preferably determined in accordance with an upper limit value and a lower limit value of the length of the circumference of the fitting part calculated by using experimental (measured) data or a theoretical equation of the dimensional tolerance and the temperature change.

As described above, in the needle attaching structure of the rotating shaft 8 of the exemplary embodiment of the resent invention, the number of the angular parts 81A of the press-in part 81 is suitably increased or decreased to adjust the length of the circumference of the fitting part of the press-in part 81 fitted to the press-in hole 93 of the needle sheath part 91 so that the contact area of the press-in part 81 to the press-in hole 93 may be adjusted. Thus, the press-in force necessary for pressing-in the rotating shaft 8 to the press-in hole 93 can be adjusted.

In the exemplary embodiment of the present invention, an adjustment of the load when the rotating shaft 8 is pressed-in to the needle sheath part 91 is described. Further, a pull-out force for pulling out the rotating shaft 8 from the needle-sheath part 91 can be adjusted at the same time by adjusting the press-in force in the present invention.

The present invention is not limited to the above-described exemplary embodiment and various kinds of forms may be embodied within a scope without departing from the gist of the invention. Namely, the meter device having the rotating shaft to which the needle attaching structure of the present invention is applied may be applied to various kinds of meters such as a fuel gauge part, a speed meter part and a water temperature gauge.

What is claimed is:

1. A needle attaching structure of a rotating shaft in which a press-in part of the rotating shaft having light guide characteristics is pressed-in to a press-in hole of a needle,
   wherein the press-in hole has a true circular form in section, the press-in part in an end part side of the rotating shaft has a regular n polygonal form in section where n is less than or equal to five,
   when the press-in part is pressed-in to the press-in hole, a vertex of the press-in part is deformed to a form along the inner surface of the press-in hole and the vertex comes into contact with the inner surface of the press-in hole, and
   a press-in force when the press-in part is inserted into the press-in hole or a pull-out force when the press-in part is pulled out from the press-in hole is set according to both the length of an intersecting line that a surface on which the outer surface of the press-in part comes into contact with the inner surface of the press-in hole and to a section intersecting orthogonally to the axial direction of the press-in part intersect, wherein the press-in part of the rotating shaft is configured to transmit light by the light guide characteristics.

2. The needle attaching structure of the rotating shaft according to claim 1, wherein the length of the intersecting line is set in accordance with at least one of the diameter of the inner surface of the press-in hole, a length to the vertex from an axis of the press-in part and the number n of the vertexes of the press-in part.

* * * * *

UNITED STATES PATENT AND TRADEMARK OFFICE
CERTIFICATE OF CORRECTION

PATENT NO.      : 8,826,507 B2
APPLICATION NO. : 12/942359
DATED           : September 9, 2014
INVENTOR(S)     : Yuusuke Aono and Shigeki Totsuka It is certified that error appears in the above-identified patent and that said Letters Patent is hereby corrected as shown below:

IN THE CLAIMS
In claim 1, column 14, line 44 delete "less than" and add --more than--

Signed and Sealed this
Twenty-first Day of June, 2016

Michelle K. Lee
*Director of the United States Patent and Trademark Office*